(12) United States Patent
Ellwood

(45) Date of Patent: Aug. 10, 2004
(10) Patent No.: US 6,772,486 B2

(54) CLIP

(75) Inventor: Simon Ellwood, Stroud (GB)

(73) Assignee: Pointflame Limited, Bristol (GB)

( * ) Notice: Subject to any disclaimer, the term of this patent is extended or adjusted under 35 U.S.C. 154(b) by 0 days.

(21) Appl. No.: 10/330,030

(22) Filed: Dec. 26, 2002

(65) Prior Publication Data

US 2003/0182773 A1 Oct. 2, 2003

Related U.S. Application Data

(63) Continuation of application No. PCT/GB01/02837, filed on Jun. 25, 2001.

(30) Foreign Application Priority Data

Jun. 28, 2000 (GB) .............................. 0015860

(51) Int. Cl.$^7$ ............................. A44B 21/00; F16B 2/10
(52) U.S. Cl. .............................. 24/334; 24/331; 24/338
(58) Field of Search ....................... 24/331, 334, 335, 24/336, 338, 324, 501, 510, 511

(56) References Cited

U.S. PATENT DOCUMENTS 2,479,356 A * 8/1949 Hennes ..................... 24/331
4,635,424 A    1/1987 Drapeau
5,214,825 A    6/1993 Hirzel
5,964,356 A   10/1999 Gareau et al.

FOREIGN PATENT DOCUMENTS

| BE | 539191    | 7/1955  |
|----|-----------|---------|
| FR | 2630955   | 11/1989 |
| GB | 164978    | 6/1921  |
| GB | 3090099   | 4/1929  |
| GB | 676087    | 7/1952  |
| GB | 904466    | 8/1962  |
| GB | 1013720   | 12/1965 |
| GB | 1587388   | 4/1981  |
| GB | 2233026   | 1/1991  |
| GB | 2288844   | 11/1995 |
| WO | WO 94/19561 | 9/1994 |

* cited by examiner

*Primary Examiner*—Robert J. Sandy
(74) *Attorney, Agent, or Firm*—MacMillan, Sobanski & Todd, LLC

(57) ABSTRACT

A clip comprising first, second and third clamping elements which are connected together by a common biasing element. The biasing element comprises a flat plate of stainless steel which is folded to form a spring which biases a part of the first element and a part of the second element together to form a primary clamp. The biasing element also biases a part of the second element and a part of the third element together to form a secondary clamp.

17 Claims, 17 Drawing Sheets

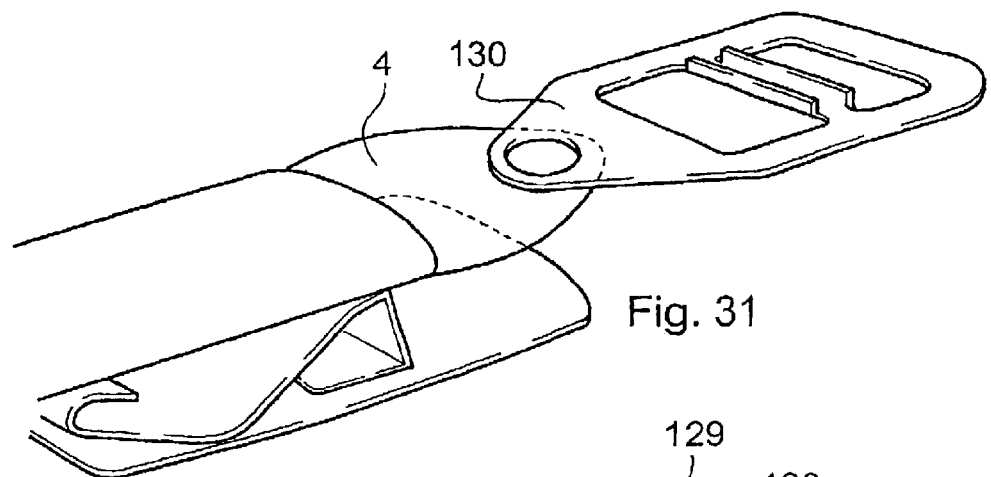
Fig. 31
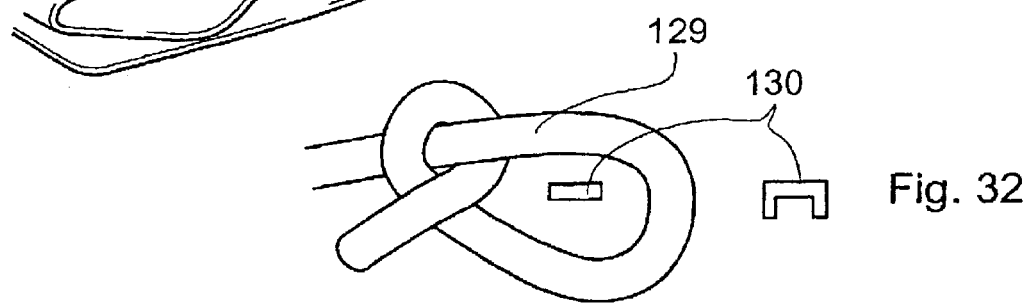
Fig. 32
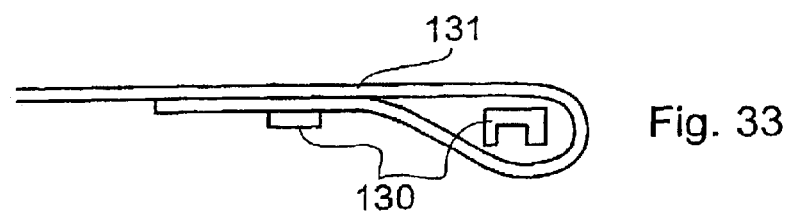
Fig. 33
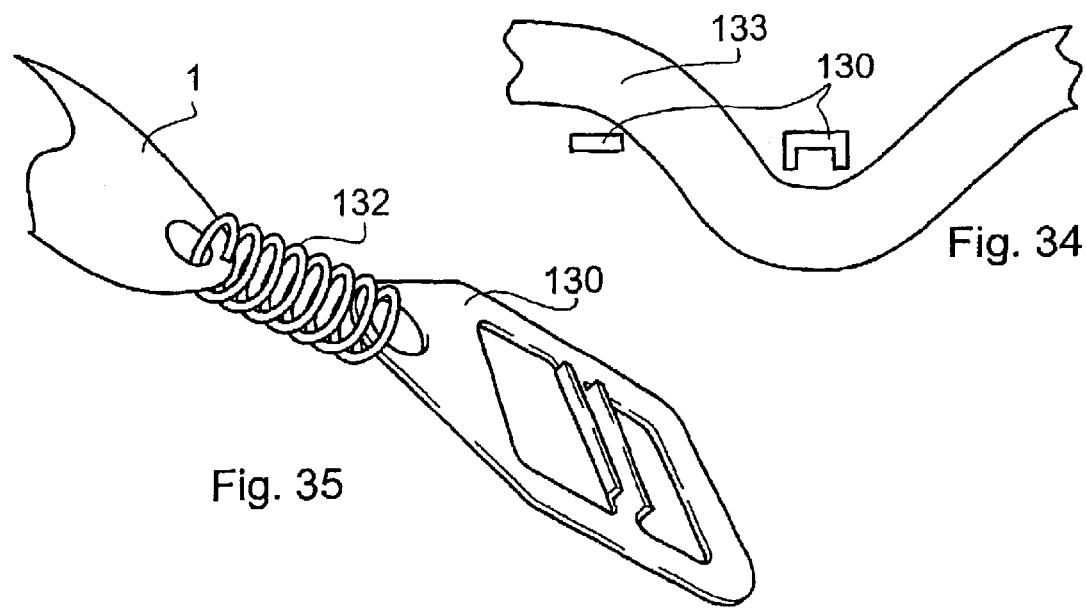
Fig. 34
Fig. 35

CLIP

This application is a continuation of PCT/GB01/02837 filed on Jun. 25, 2001.

This invention relates to clips, and particularly, although not exclusively relates to clips which are used to secure articles to a support surface.

BACKGROUND TO THE INVENTION

In hospitals, conventional two jaw clips such as bulldog (registered trade mark) clips are used to hold cables and other articles to furniture such as the frames of beds or to operating theatre equipment. Such clips are not only inconvenient to use, but are prone to rust and are difficult to sterilise.

SUMMARY OF THE INVENTION

According to a first aspect of the present invention, there is provided a clip comprising first, second and third clamping elements which are connected together by a common biasing element which biases a part of the first element and a part of the second element together to form a primary clamp and which biases a part of the second element and a part of the third element together to form a secondary clamp.

Preferably, the clip further comprises a fourth clamping element which is connected to the other clamping elements by the biasing element and is biased into contact with one of the other clamping element by the biasing element.

The first and/or second and/or third and/or fourth clamping element may comprise a part of the biasing element. Most preferably, the first and/or second and/or third and/or fourth clamping elements are integrally formed with the biasing element.

Preferably, the biasing element comprises a flat resilient member. Most preferably, the biasing element comprises a folded metal spring. Preferably, the biasing element is formed from steel and most preferably is formed from stainless steel.

Preferably the biasing element is provided with tangs which locate in corresponding recesses or openings in the clamping element such that the clamping elements are connected together by the biasing element. Preferably, the parts of the respective elements which are biased together comprise jaws which are adapted to grip particular articles. Preferably, at least one pair of jaws is provided with cooperating pairs of semi-circular recesses or cut-outs which are adapted to grip a support surface such as metal frame furniture or medical apparatus.

In a preferred embodiment of the invention, each jaw is provided with an insert which is pivotally mounted in the outer end of the jaw. Preferably, each insert is provided with a toothed portion which abuts the corresponding toothed portion formed in an insert mounted in the opposing jaw. The inserts may be replaceable, so that the inserts in respective pair of jaws can be replaced when worn out or damaged or by inserts of an alternative configuration which are suitable for a different application of the clip.

Preferably, the primary clamp is used to secure the clip to a support surface and the secondary clamp is used to grip an article such as a pipe, a sheet of paper or a waste bag. If the secondary clamp opens on the opposite end to the primary clamp a dual holding action is provided which facilitates movement of the clip to a different position without opening the secondary clamp.

Preferably, the abutting portions of respective jaws are serrated. Preferably at least one jaw of a respective pair of jaws is provided with at least one projection that prevents the respective pair of jaws from meeting at their free ends when the jaws are in the closed position.

Preferably, at least two spaced apart projections are provided. It will be appreciated that a tube can be supported between the two spaced apart projections without the risk of it being crushed or being pulled from the clip.

Preferably, the main clamp can attach to material thicknesses between about 25 mm down to paper thickness. Preferably, the main clamp can also clamp round stock material of approximately 12 mm up to 32 mm.

Preferably, the end of at least one of a respective pair of cooperating clamping elements is provided with means for increasing the grip provided by the clamp. Preferably, the said means for increasing the grip comprises a non-slip surface applied to one or more of the clamping elements. Alternatively, or in addition, the said means for increasing the grip may comprise an outwardly projecting lip at an end of the respective clamping element opposite to the end which comprises a jaw of the clip.

Preferably, the first, second, third and/or fourth clamping elements are substantially U-shaped in cross-section. This has the effect of stiffening the clamping elements whilst still allowing them to be cleaned and sterilised easily.

According to a second aspect of the present invention there is provided a double clip comprising a first clamping element and a second clamping element connected together by a spring element which biases an end of the first element and an end of the second element together to form a primary clamp and which forms together with one of the clamping elements a secondary clamp.

BRIEF DESCRIPTION OF THE DRAWINGS

For a better understanding of the present invention and to show how the same may be carried into effect reference will now be made, by way of example, to the accompanying drawings, in which:

FIG. 31 shows a clip fitted with a swivelling buckle;

FIG. 32 shows how a string or rope may be connected to the buckle of FIG. 31;

FIG. 33 shows how a strap may be connected to the buckle of FIG. 31;

FIG. 34 shows how a pipe or tube may be fitted to the buckle of FIG. 31;

FIG. 35 shows how the buckle may be connected to the clip by means of a resilient connection;

FIG. 1 shows a clip 1 in accordance with a first embodiment of the present invention. The clip comprises a single biasing element 2 which is formed by folding a flat metal plate into the configuration best illustrated in FIG. 2. The biasing element 2 is connected to a first clamping element 4 and a second clamping element 6, and not only spaces these clamping elements apart, but also resiliently biases jaws 8, 10 of the clamping elements 4, 6 together to form a primary clamp. It will be appreciated that the biasing element 2 has an undefined pivotal hinge point, but nonetheless brings the two clamping elements 4, 6 symmetrically together.

Figure 2:
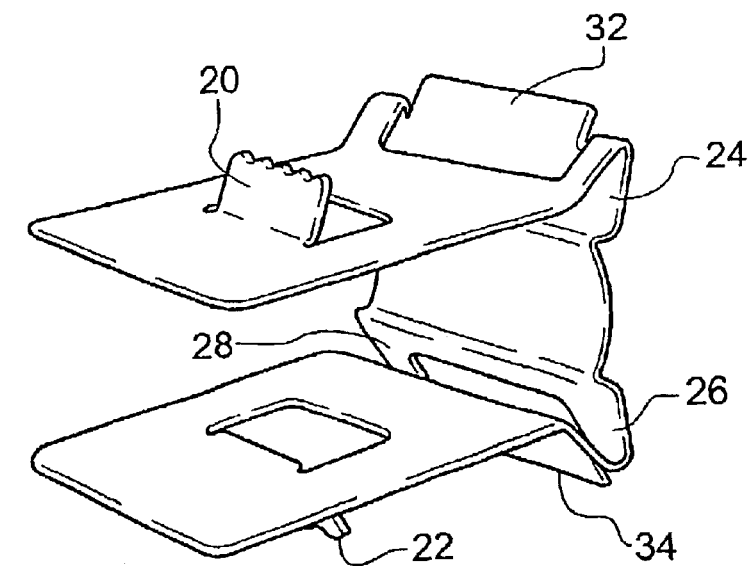
FIG. 2 is a perspective view of the one-piece biasing element of the clip of FIG. 1.

Each jaw 8, 10 is integrally formed with a respective handle portion 12, 14 of the clamping elements 4, 6. Respective arms 16, 18 of the biasing element 2 extend, in a closed state of the clamp substantially in a direction parallel to the handle portions 12, 14 of the clamping elements 4, 6. As best shown in FIG. 2, ribs 20, 22 are punched out of the arms 16, 18 of the biasing element 2 and project substantially at right angles from the arms 16, 18. In a closed condition of the clamp, these ribs 20, 22 abut inner surfaces of the handle portions 12, 14 of the clamping elements 4, 6.

The arm 16 is formed from the resilient material of the biasing element 2, and is resiliently biased towards the handle portion 12. Hence, the arm 16 operates as a third clamping element in conjunction with the handle portion 12 of the first clamping element 4. Similarly, the arm 18 acts as a fourth clamping element in conjunction with the handle portion 14 of the clamping element 6. Therefore, articles to be gripped can be secured between the main jaws 8, 10 (primary clamp) and/or between the arms 16 and handle portion 12 (secondary clamp) and/or between the arm 18 and handle portion 14 (tertiary clamp).

Figure 3:
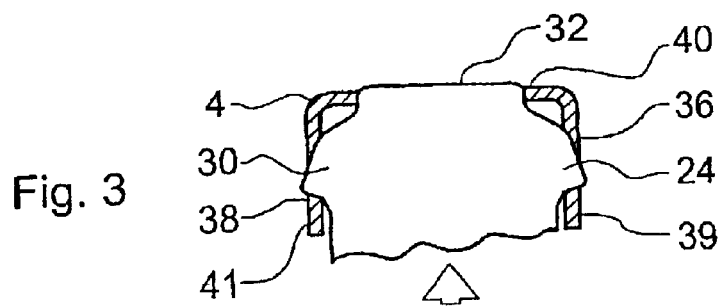
FIG. 3 is an enlarged cross-section on the line III—III in FIG. 1.
Figure 4:
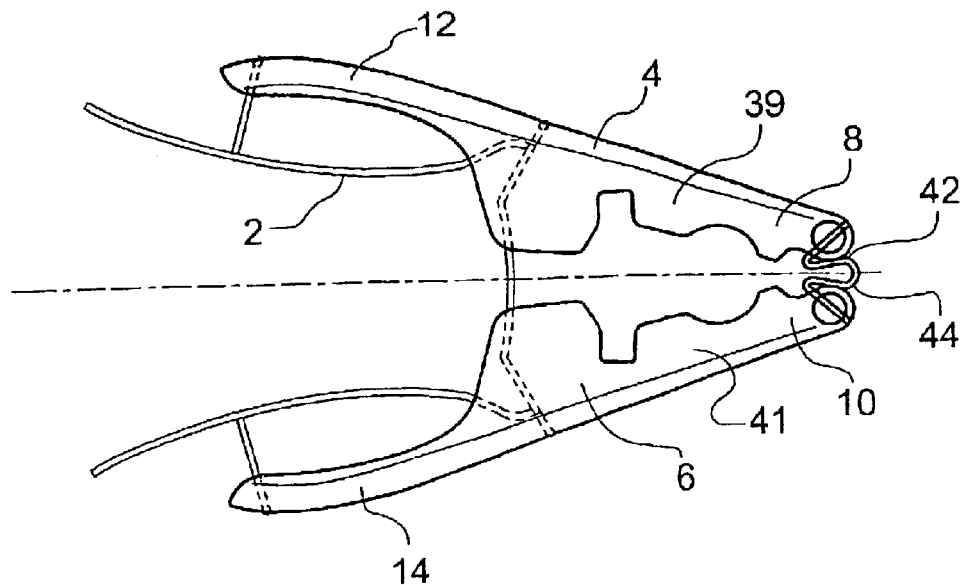
FIG. 4 is a partially cut-away side view of a second embodiment of clip.
Figure 5:
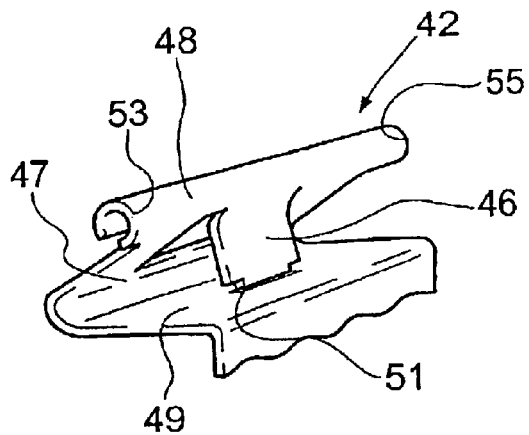
FIG. 5 is an enlarged perspective view of a pivoting jaw element for use in the clip of FIG. 4.
Figure 6:
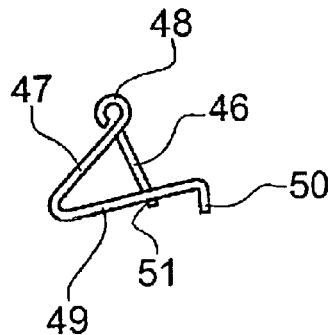
FIG. 6 is a side view of the pivoting jaw element of FIG. 5.

Referring to FIGS. 2 and 3, the biasing element 2 is provided with four side tangs 24, 26, 28, 30 which project from the sides of the biasing element 2 and top and bottom tangs 32, 34 which project respectively from the top and bottom of the biasing element 2.

Figure 1:
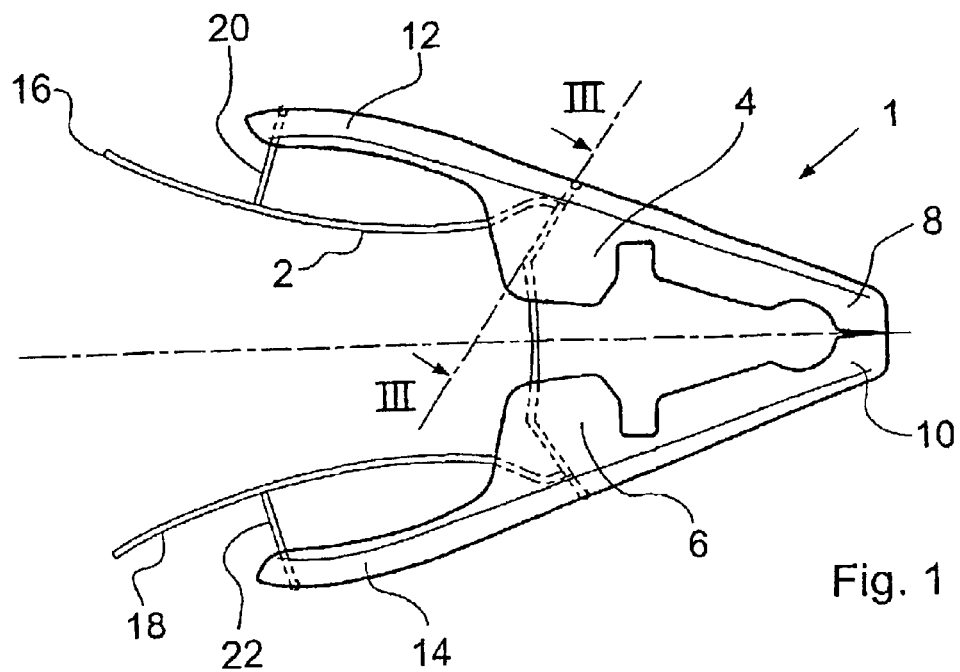
FIG. 1 is a partially cut-away side view of a first embodiment of clip in accordance with the present invention.

FIG. 3 is an enlarged cross-section along the line III—III in FIG. 1 and illustrates how the side tangs 24, 30 and the top tang 32 snap fit into corresponding openings 36, 38, 40 formed in the clamping element 4. In a similar manner, the tangs 26, 28 and 34 are received in corresponding openings (not shown) in the second clamping element 6.

The first clamping element 4 is substantially U-shaped when viewed on line III—III in FIG. 1. Furthermore, the side tangs 24, 30 are substantially of saw toothed shape. Consequently, the biasing element 2 can be fixed to the first clamping element 4 simply by forcing the biasing element 2 into the open mouth of the U-shaped first clamping element 4. As the biasing element 2 is inserted, flanges 39, 41 of the U-shaped first clamping element 4 are deflected outwardly as they ride along the leading edges of the saw tooth profiles of the tangs 24, 30 until the tangs 24, 30 and the top tang 32 align with the respective openings in the first clamping element 4. At this point, the flanges of the U-shaped first clamping element 4 are able to spring back into the configuration shown in FIG. 3. This snap-fit method of connecting the biasing element 2 to the clamping elements 4, 6 greatly speeds up the assembly process. Furthermore, because the first biasing element 2 is formed from a single flat sheet of material such as stainless steel and because the ribs 20, 22 and tangs 24, 26, 28, 30, 32, 34 are all punched or cut out in a single stamping operation, the clip is extremely quick and easy to produce. In its simplest form, the clip comprises only three stamp parts, the biasing element, the first clamping element 4 and the second clamping element 6.

The spring pressure of the secondary and tertiary clamp is preferably less than that of the primary clamp, so that the secondary and tertiary clamps can be opened individually without simultaneously opening the primary clamp. Furthermore, by applying pressure to the outside surfaces of the handle portions 12, 14, the main clamp can be opened without opening the secondary and tertiary clamps.

FIGS. 4 to 8 show a clip having pivoting jaw elements 42, 44. These jaw elements are illustrated in detail in FIGS. 5 and 6. The jaw elements 42, 44 each comprise a single flat sheet of material such as stainless steel, which is punched out to form a support strut 46 and folded back on itself, so that each jaw element 42, 44 comprises a substantially V-shaped plate when viewed in cross-section. Furthermore, each jaw element 42, 44 is provided with a cylindrical rolled potion 48 on the outer end of one arm 47 of the V-shaped plate and an outwardly projecting toothed portion 50 on the end of the other arm 49 of the V-shaped plate. The support strut 46 extends between the arms 47, 49 of the V-shaped plate and is located by engagement in an opening 51 formed in the opposing arm 49 of the V-shape plate.

Each pivoting jaw element 42, 44 is connected to a respective clamping element 4, 6 by means of engagement of free ends 53, 55 of the cylindrical rolled portion 46 with openings formed in the flanges 39, 41 in the channel shaped first and second clamping elements 4, 6 respectively. Consequently, the pivoting jaw elements use a rolling leverage point, giving a longer lever arm to exert more pressure at the toothed portion 48.

Figure 7:
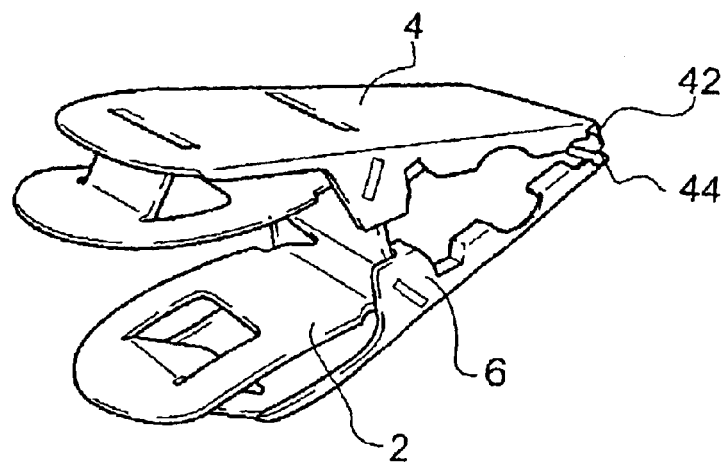
FIG. 7 is a perspective view of the second embodiment of clip.
Figure 8:
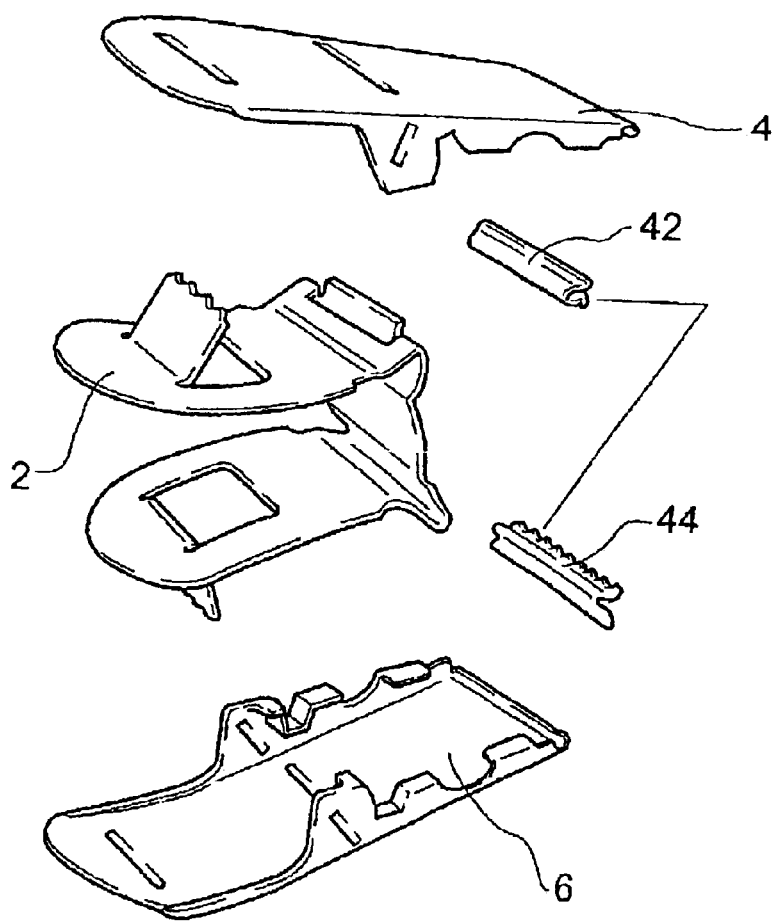
FIG. 8 is an exploded view of the second embodiment of clip.

As the pivoting jaw elements 42, 44 are separate components from the clamping elements 4, 6, they can be formed from different materials which may be more suitable for their function as jaw elements. For example, they may be made from softer material than the clamping 4, 6, so that they do not damage articles gripped by the clip. Furthermore, if the jaw elements become damaged, or if an alternative configuration of jaw elements is required, the jaw elements may simply be exchanged by removing the ends 53, 55 of the cylindrical rolled portion from the openings in the respective clamping element 4, 6, exchanging the jaw element and then snap fitting it into the clamping element 4, 6. If replacement of the jaw 42, 46 is not required, as best shown in FIGS. 7 and 8, the entire clip can be formed from only five components.

In addition to performing a straightforward clamping action, extra attachments can be added to increase the function of the clip. These attachments can be inserted between the arm 16 and handle portion 12 or between the arm 18 and handle portion 14 and are held in place by means of the spring pressure applied by the respective arm 16, 18 against its corresponding handle portion 12, 14.

The attachment can take the form of a pressed and folded hook. If the hook centre is aligned with the centreline of the clip, there results a vertical downward pressure through the clip when used in a vertical orientation.

Figure 9:
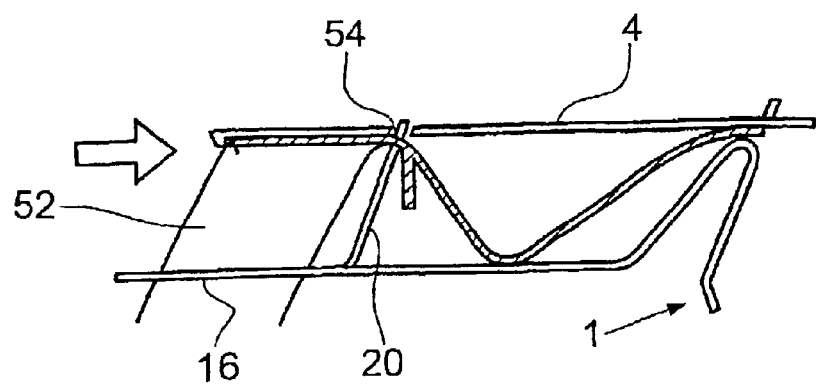
FIG. 9 is an illustration of a hook fitted to an arm of a clip in accordance with the present invention.
Figure 10:
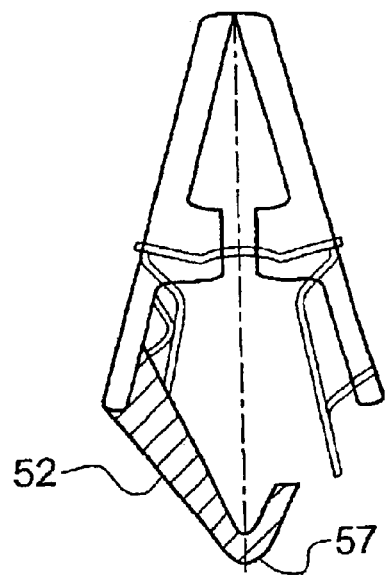
FIG. 10 is a side view of a clip to which a hook has been fitted.

In the embodiment illustrated in FIGS. 9 and 10, a hook is attached to the clip by engagement of the rib 20 of the arm 16 of the biasing element 2 through a slot 54 formed through an end fitting 57 which is integrally formed with the hook 52. Merely by deflecting the arm 16 away from the handle portion 12, the rib 20 is withdrawn from the slot 54, so that the hook 52 can be removed from the clip.

Figure 11:
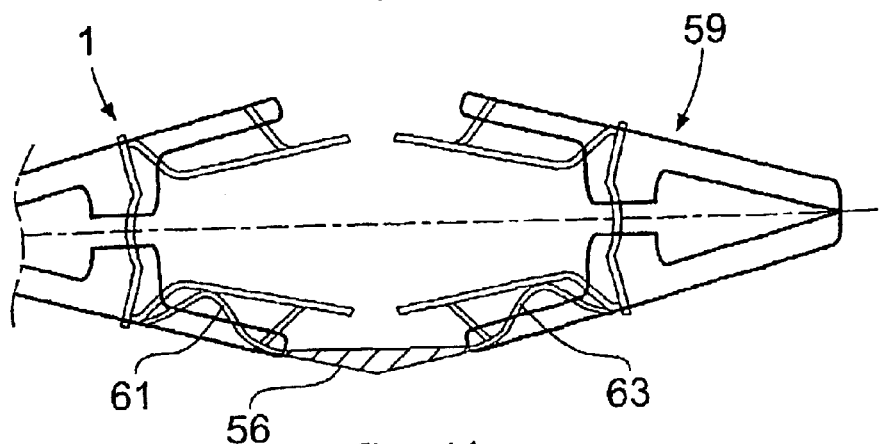
FIG. 11 shows two clips in accordance with the present invention which have been fixed together by a removable connector.

FIG. 11 illustrates a further embodiment in which a connector 56 is used to join two clips 1, 59 together end to end. The connector 56 is provided with end fittings 61, 63 which are substantially identical to those of the hook 52 and is therefore engaged by the clips 1, 59 in the same way as the hook of the previous embodiment.

Figure 12:
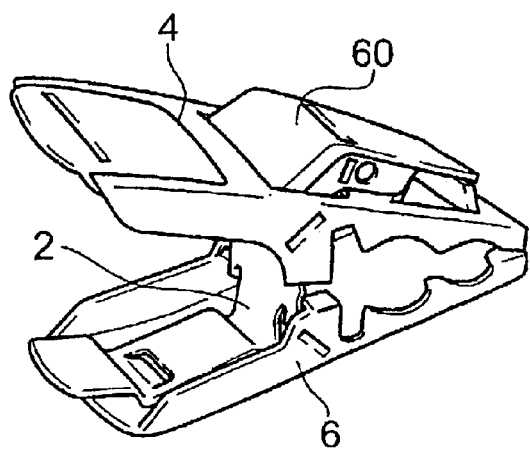
FIG. 12 shows a third embodiment of clip.
Figure 13:
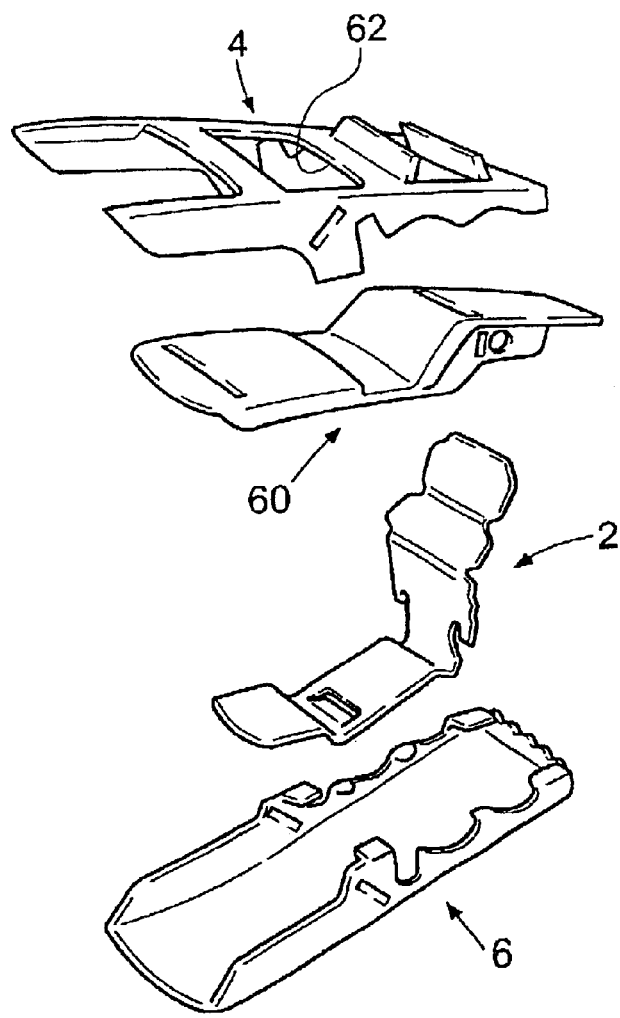
FIG. 13 is an exploded view of a clip in accordance with FIG. 12.

FIGS. 12 and 13 show an alternative embodiment of clip in which a secondary clamp is provided by a third clamping element 60 which fits through an opening 62 formed in the first clamping element 4. All three clamping elements 4, 6, 60 are resiliently biased and fixed together by means of a common biasing element 2 which engages with the respective clamping elements 4, 6, 60 by means of pressed out portions and tangs, as in the previous embodiments.

Figure 14:
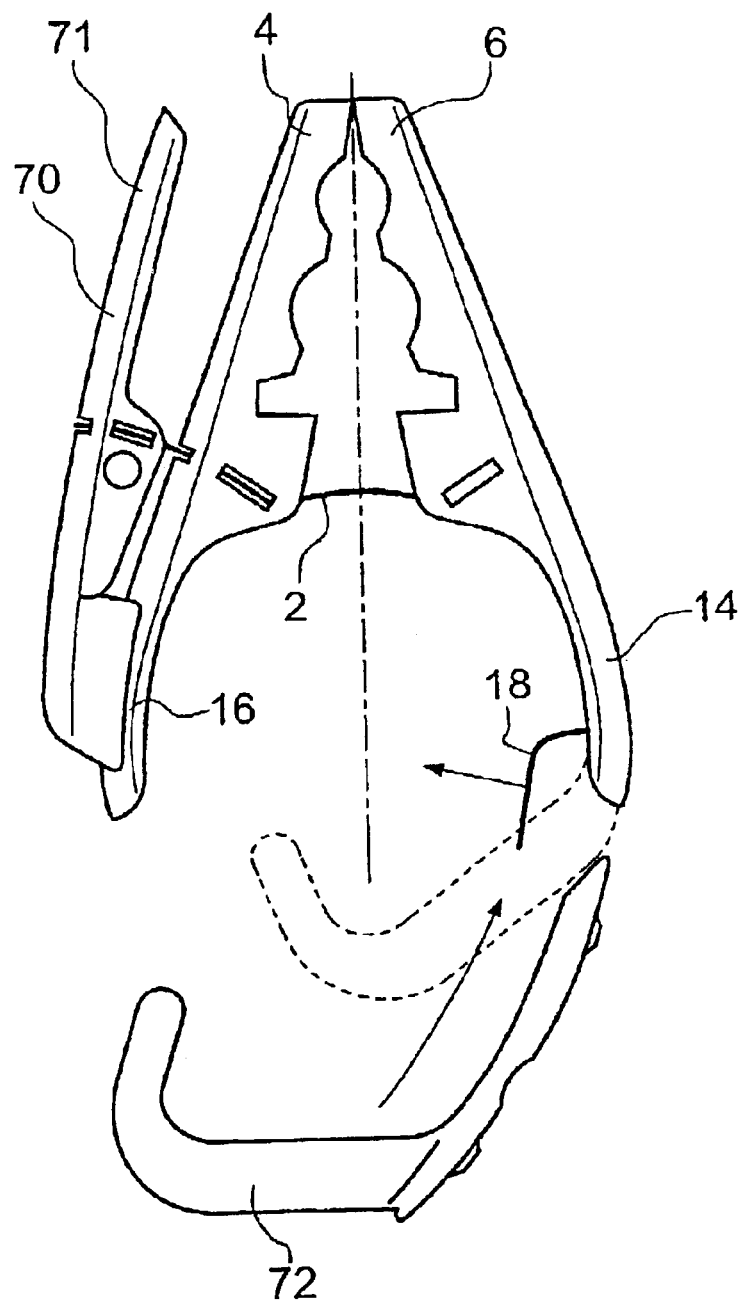
FIG. 14 shows a fourth embodiment of clip provided with a hook and additional clamping jaws which open at an end of the clip opposite to the main clamping jaws.

FIG. 14 shows an alternative embodiment of clip in which the third clamping element 70 is mounted entirely on the outside of the first clamping element 4 and is resiliently biased and connected by means of the common biasing element 2 which interconnects both the first, second and third clamping elements 4, 6, 70.

The biasing element 2 in the region of the second clamping element 6 is extended substantially along the length of the handle portion 14 of the second clamping element 6 and forms, together with the handle portion 14, a tertiary clamp which, as in the previous embodiment can be used to secure hooks 72 or other accessories. Even with the hook 72 in place, the main clamp can be opened by pressing together the handle portions 12, 14 of the first and second clamping elements 4, 6.

In this embodiment, the end of the arm 18 of the biasing element 2 is cranked, so that it is easier to grip and pull away from the handle portion 14 to release the hook 72 or other accessory. Thus, the main clamp can be opened by squeezing together the handles 14, 16 of the first and second clamping elements 4, 6. The secondary clamp can be opened by pressing on a handle portion 71 of the third clamping element 70 and the outer surface of the second clamping element 6, and the third clamp can be opened by pulling on the cranked portion of the arm 18 of the biasing element 2, thereby pulling it away from the handle portion 14 of the secondary clamping element 6. As the spring pressure required to pull the arm 18 away from the handle portion 14 is less than the spring pressure required to open the primary clamp, the tertiary clamp can be opened and the accessory released, without opening the primary clamp. Thus, in this embodiment, the primary, secondary and tertiary clamps can all be opened independently.

Figure 15:
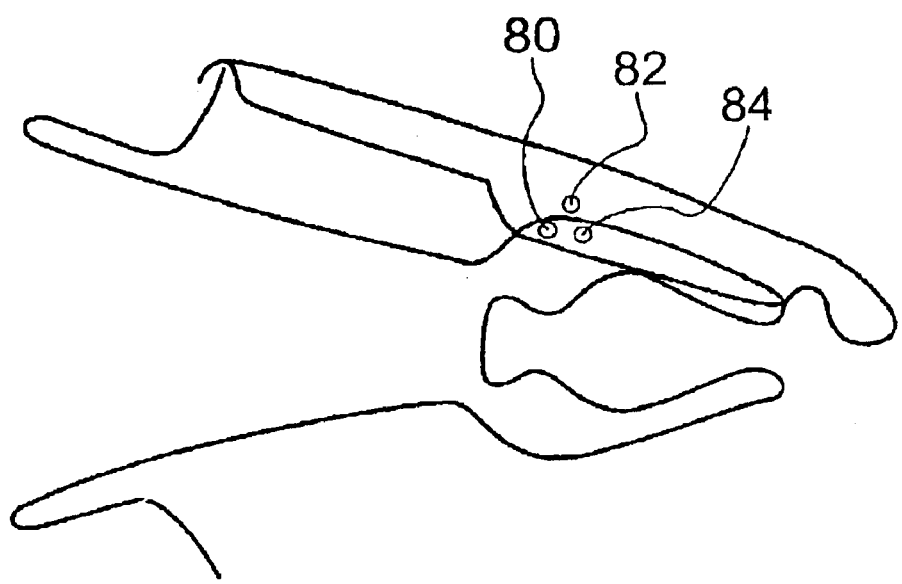
FIG. 15 shows a fifth embodiment of clip in which the biasing element is pinned to the clamping elements of the clip.

FIG. 15 shows an alternative embodiment of clip in which the biasing element 2 is of a smoother rolled configuration and does not have the cut-outs and sharp folds of the previous embodiments. The biasing element 2 is connected to the first and second clamping elements (only the first clamping element 4 is illustrated in FIG. 15), by means of pins 80, 82, 84, which are fitted through openings formed in the flanges 39, 41 of the U-shaped first and second clamping elements 4, 6.

Figure 16:
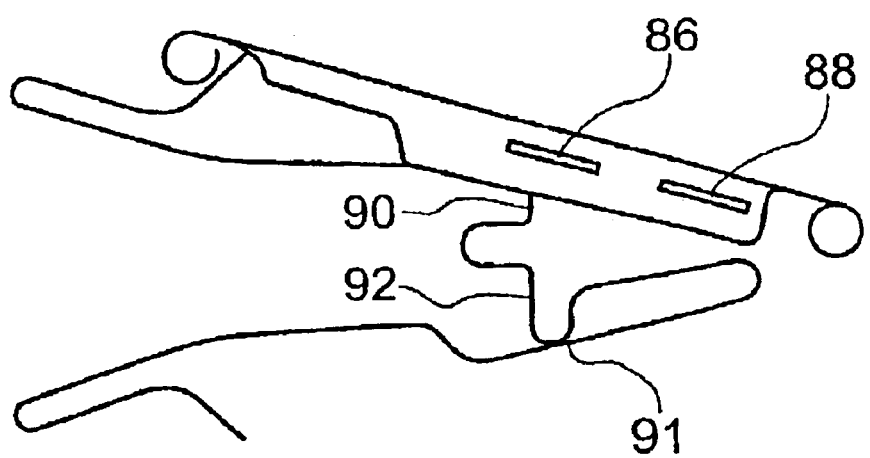
FIG. 16 shows a sixth embodiment of clip in which the biasing element is connected to the clamping elements of the clip by means of snap-fit tangs engaged in corresponding openings in the clamping elements.

FIG. 16 shows an embodiment similar to that of FIG. 15, but in which the pins are replaced by slots formed in the first and second clamping elements 4, 6. As in the earlier embodiments, tangs (not shown) are formed on the biasing element 2 and these tangs snap-fit into the slots 86, 88 formed in the first clamping element 4. In a similar manner, the second clamping element 6 (not shown) is fitted to the lower portion of the biasing element 2.

The biasing element 2 is slightly different in form from the previous embodiment, since it is provided with opposing rolled portions 90, 92 which provide respective rolling hinge points 98 at which the biasing element 2 is folded back on itself.

Figure 17:
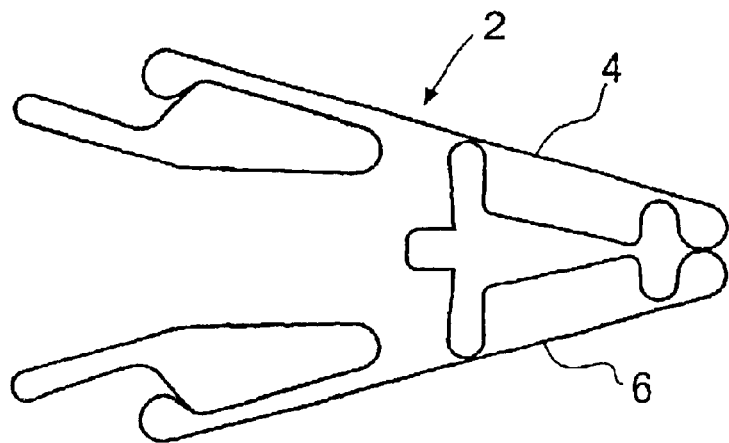
FIG. 17 shows a seventh embodiment of clip in which the entire clip is formed from a one piece biasing element.
Figure 18:
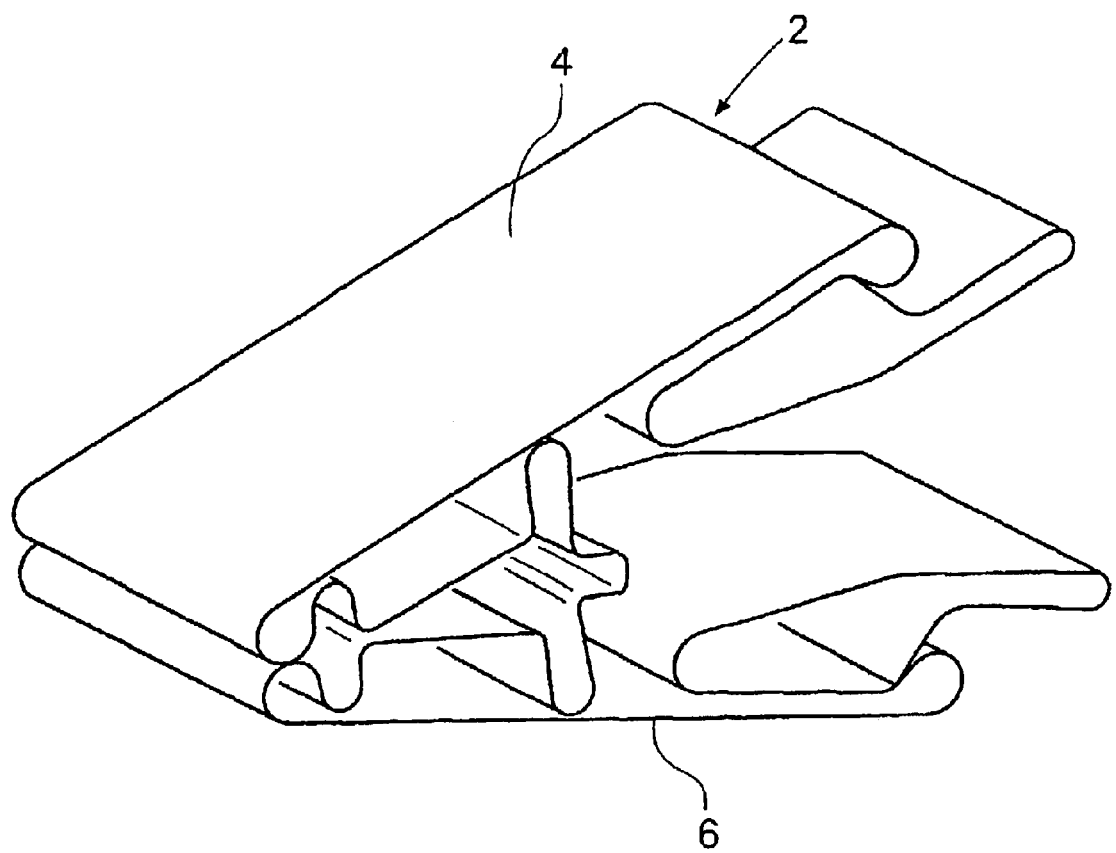
FIG. 18 is a perspective view of the clip of FIG. 17.

FIGS. 17 and 18 show an alternative embodiment of clip in which the entire clip is formed from a single strip of material which is folded to form both the biasing element 2 and the first and second clamping elements 4, 6. As the entire clip is formed from a single piece, there are modest manufacturing costs and no assembly costs involved in producing the clip. Furthermore, the clip is extremely easy to clean and to sterilise.

Figure 19:
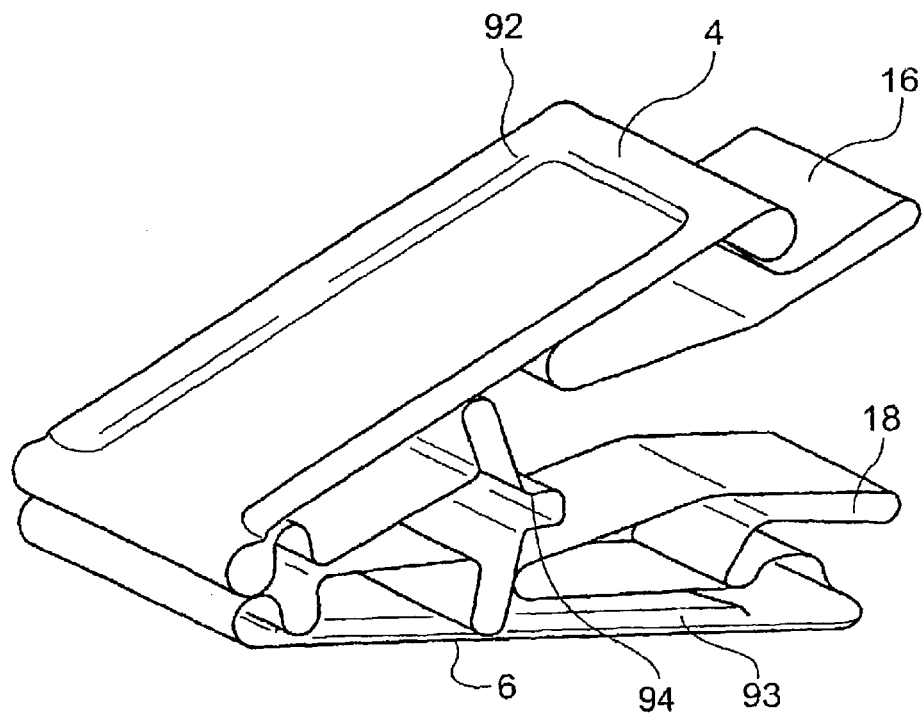
FIG. 19 is a perspective view of a modified clip with pressed out clamping elements.
Figure 20:
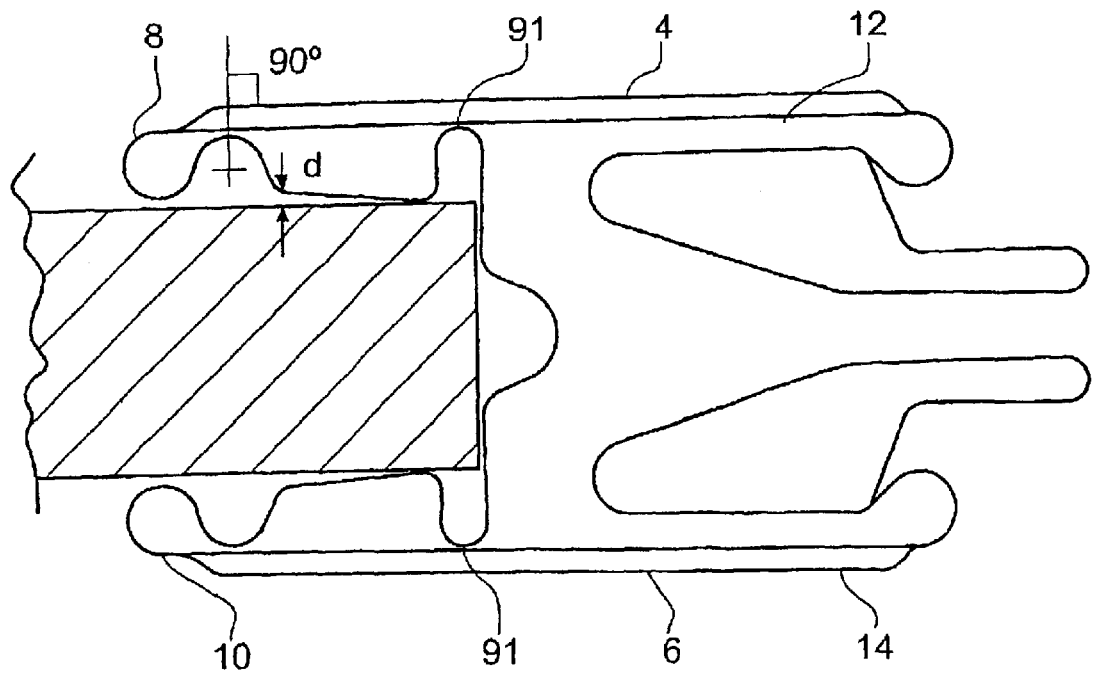
FIG. 20 is a side view of the clip of FIG. 19 attached to a support surface such as a bed frame.
Figure 21:
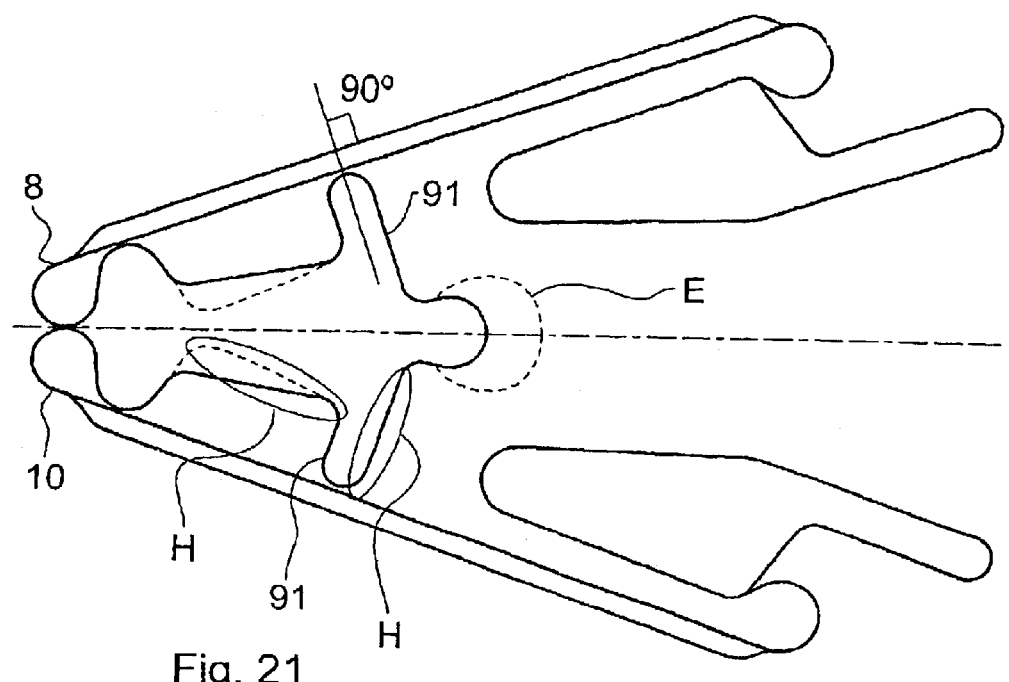
FIG. 21 is a side view of the clip of FIG. 19 illustrating areas of pre-stress.
Figure 22:
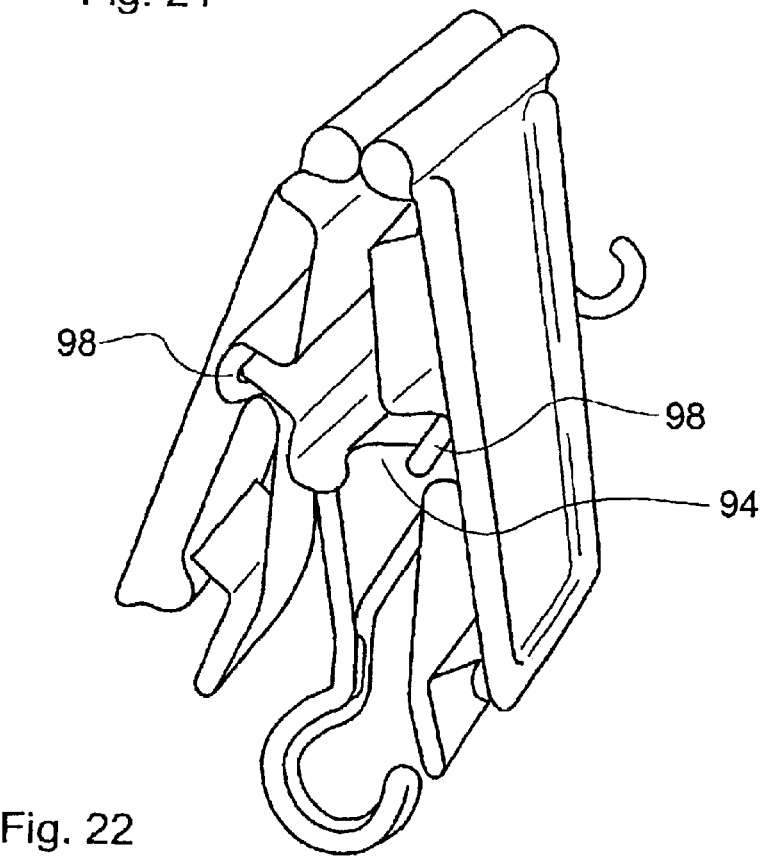
FIG. 22 is a perspective view of the clip of FIG. 19 supporting a hook.

FIGS. 19 to 21 show a further embodiment of clip which is similar to the embodiment of FIGS. 17 and 18 but in which the first and second clamping elements 4, 6 are stiffened at their periphery by pressed-out regions 92, 93. In addition, the arms 16, 18 are of reduced width compared to a central region 94 of the biasing element 2. The central region 94 of the biasing element 2 provides the biasing action which brings the first and second clamping elements 4, 6 together and the resilience of the material of the arms 16, 18 provides the biasing action which biases the arms 16, 18 towards the first and second clamping elements 4, 6. Consequently, by reducing the width of the material of the arms 16, 18, the force required to open the secondary and tertiary clamps is reduced compared to the force required to open the primary clamp, so that by squeezing together the arms 16, 18, the secondary and tertiary clamps can be opened without opening the primary clamp.

At the same time that the pressed-out portions 92, 93 are formed, the edges of the primary and secondary clamping elements 4, 6 are given a curved profile, so that they are comfortable to grip. Furthermore, because the edges of the primary and secondary clamping elements 4, 6 are raised, grip on the clamping elements is improved.

FIG. 20 illustrates a clip in accordance with this embodiment of the invention gripping a support surface, such as the frame of a bed. The jaws 8, 10 of the clip are opened by squeezing together the handle portions 12, 14, such that the bed frame can be slid into the open jaws of the clip. Pressure on the handle portions 12, 14 is then released, so that the jaws 8, 10 spring together to grip the bed frame.

In the illustrated embodiment, the gap between the jaws 8, 10 is greatest at an intermediate position along the length of the jaws 8, 10, so that the clip does not catch when it is pushed on to a thick flat surface such as the illustrated bed frame. In a preferred embodiment, the maximum set back distance of the jaws, shown as "d" in FIG. 20, is approximately 1 mm.

As the handle portions 12, 14 are squeezed together the first and second clamping elements 4, 6 pivot about pivot elements 91 which are formed from bent over-portions of the biasing element 2, such that the jaws 8, 10 open.

FIG. 21 illustrates a preferred embodiment of one-piece clip in which the pivot elements 91 abut the respective first and second clamping elements 4, 6 substantially at right angles. This prevents excessive slippage of these pivot elements 91 along the first and second clamping elements 4.6 as the clip is opened and closed. Excessive movement of the pivot elements 91 is undesirable because it would alter the perceived spring tension in the clip, during opening or closing of the clip.

The strength of the spring can be reduced by enlarging the diameter of a central bent over portion of the biasing element 2, so that if follows for example profile E illustrated in FIG. 21. In a preferred embodiment of clip, the regions H should be pre-tensioned when initially pressing and stamping the one-piece spring. This will provide the necessary force to positively bias the jaws 8, 10 of the clip together when the jaws are closed.

Figure 23:
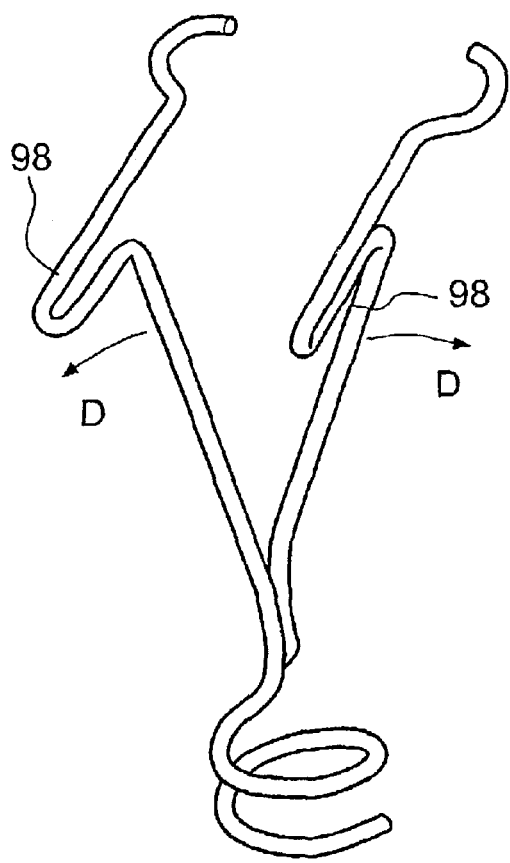
FIG. 23 shows a clip-in spring accessory.
Figure 24:
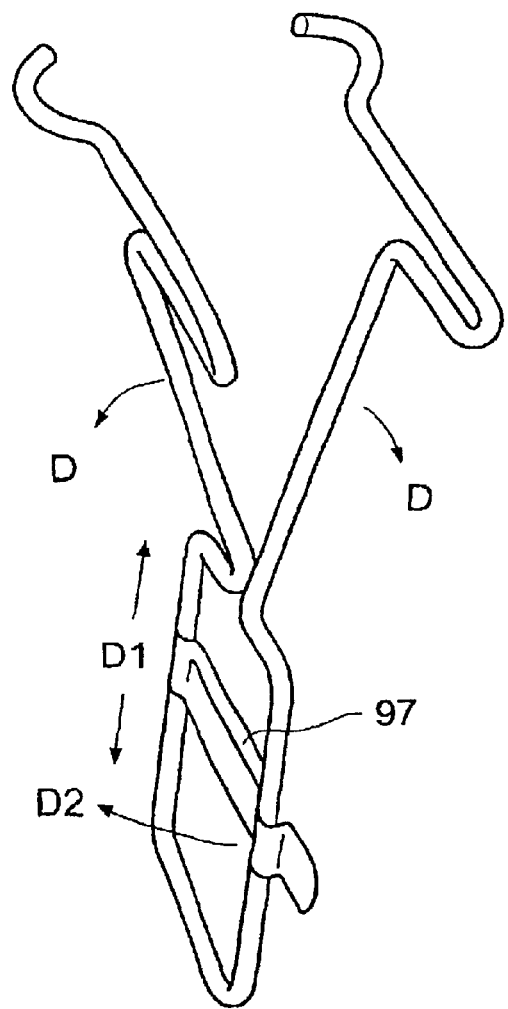
FIG. 24 shows a clip-in buckle accessory.

FIGS. 22 to 25 show how various accessories can be attached to the clip. In a first arrangement, a spring (as illustrated in FIG. 23) or a sliding buckle (as illustrated in FIG. 24) can be attached to the clip by means of cranked arms 98 which are slid over the pivot elements 91 of the biasing element 2. As best illustrated in FIG. 23, the cranked arms 98 of the accessory are biased apart in the directions D—D so that they grip the clip more securely when attached. Referring to FIG. 23, the accessory in the form of a sliding buckle is provided with a central keeper which can be slid up and down the buckle in the direction $D_1$ and is able to snap open in the direction $D_2$. The particular advantage of a snap-over keeper arrangement in this buckle design is that cables etc. can be attached to the buckle without having to thread them through the buckle.

Figure 25:
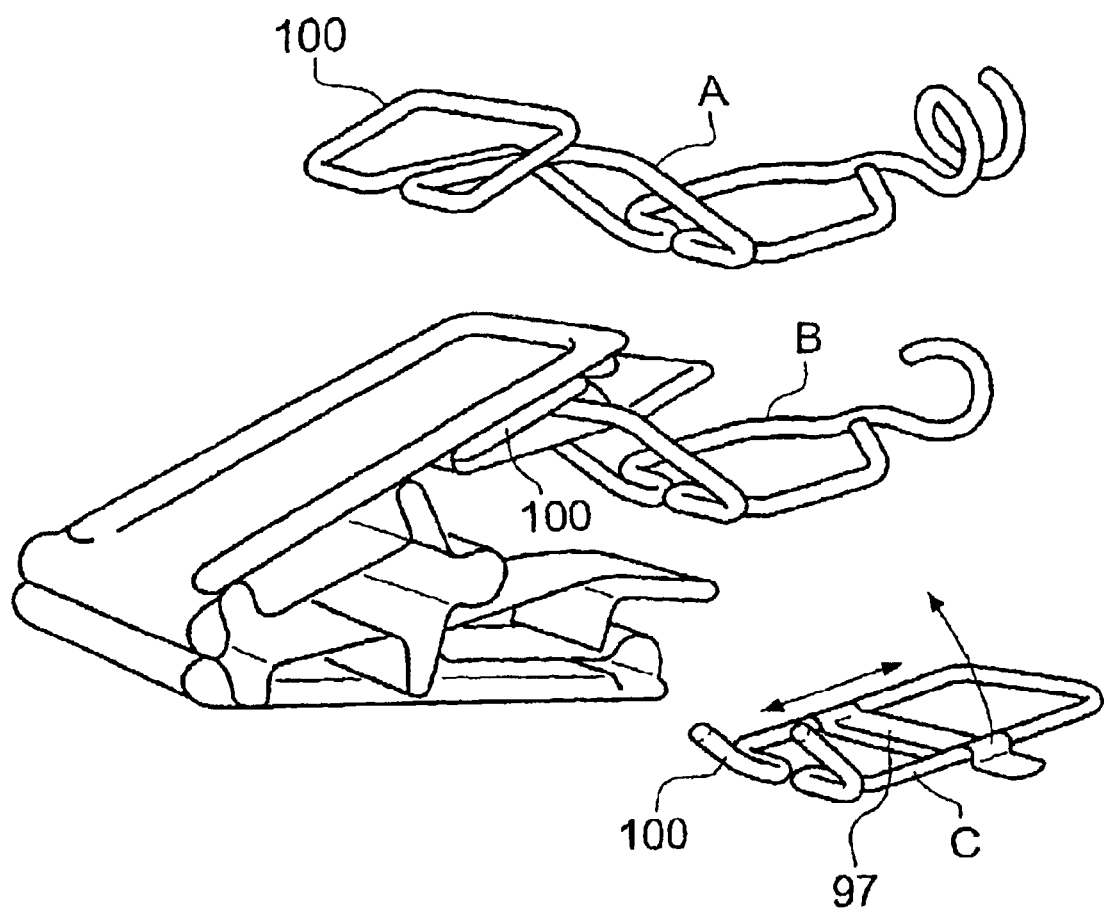
FIG. 25 is a perspective view of the clip of FIG. 19 provided with a range of clip-in accessories which use an alternative fixing arrangement.

FIG. 25 shows further embodiments of accessory in the form of a spring (a), a hook (b), or a sliding buckle (c) which are each provided with a clamping foot 100 which is clamped by the secondary and/or tertiary clamps.

Figure 26:
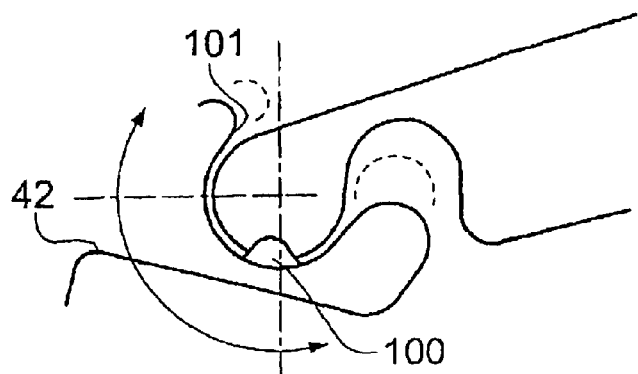
FIG. 26 is an enlarged end view of a clamping element provided with a pivoting jaw element.
Figure 27:
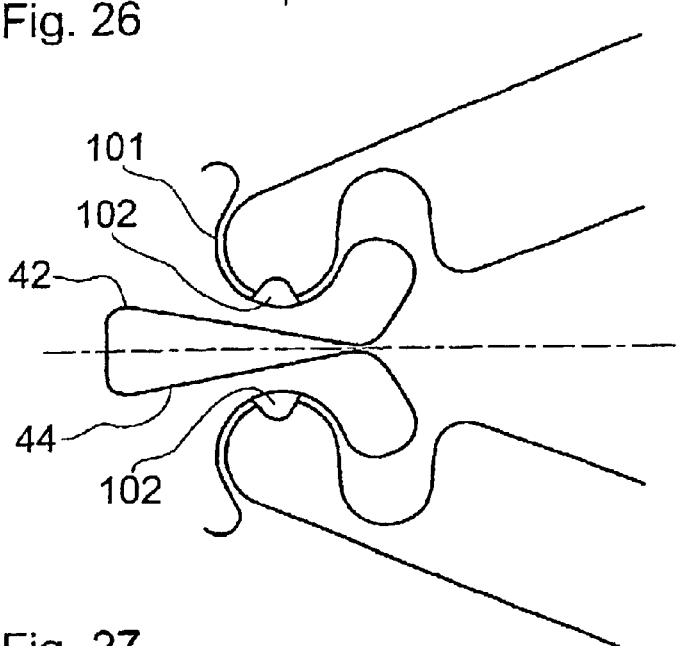
FIG. 27 is an enlarged end view of a pair clamping elements fitted with opposing pivoting jaw elements.
Figure 28:
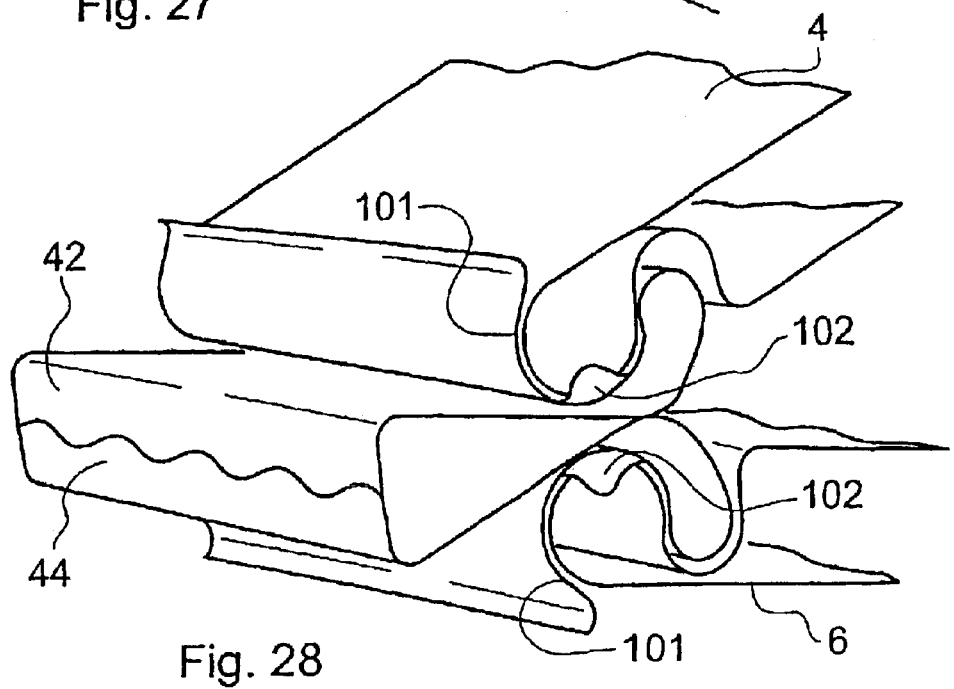
FIG. 28 is a perspective view of an end of a pair of clamping elements provided with pivoting jaw elements.

FIGS. 26 to 28 show how a clip in accordance with the embodiments of FIGS. 15 to 25 can be provided with pivoting jay 42, 44. In the previous embodiment the pivoting jaw elements comprise small diameter rolled cylindrical hinge portions. In this embodiment, an end of each pivoting jaw element is formed into a larger diameter recess 101 which is semi-circular in cross-section and is adapted to snap-fit over the end of the respective jaw 8, 10 of the first and/or second clamping elements 4, 6. The recess 101 of each pivoting jaw element 42, 44 is provided with an upstanding tab 102 which provides lateral location of the pivoting jaw element 42, 44 on the respective jaw 8, 10. It will be appreciated that the pivoting jaw 42, 44 can be removed simply by pulling them off the jaws 8, 10, such that the pivoting jaw 42, 44 can be replaced with a pivoting or fixed jaw element of an alternative configuration, or can be replaced with an identical pivoting jaw element, if worn out or damaged.

Figure 29:
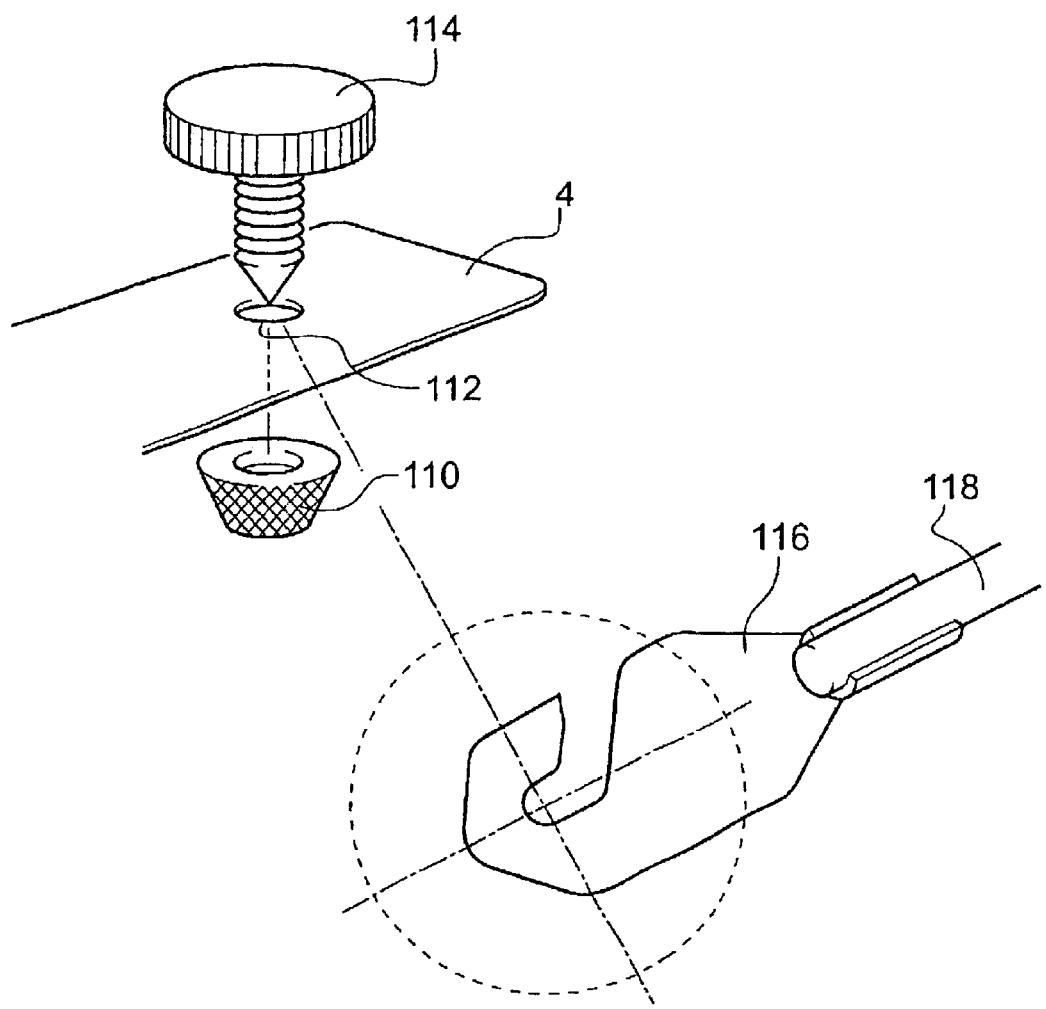
FIG. 29 is a perspective view of a screw connection for connecting an accessory such as a cable to the clip.

FIG. 29 shows how additional accessories may be attached to the clip by forming openings and/or threaded bores through the clip which are adapted to receive threaded fasteners. In the particular embodiment illustrated in FIG. 29, a captive nut 110 is welded to an inside surface of the clip adjacent an opening 112 formed through the clip. A threaded fastener 114 is secured through the opening 112 into the captive nut 110 and can be tightened down on to an accessory, such as a connector 116 having a rigid or flexible shaft 118 which is used to connect the clip to a further clip, or to a support structure etc.

Figure 30:
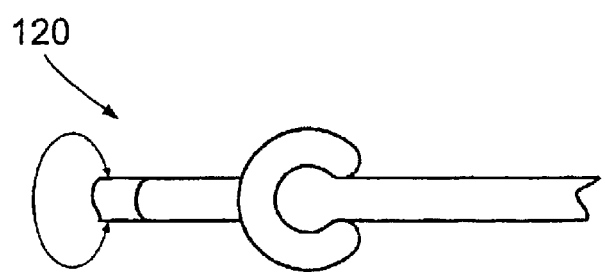
FIG. 30 shows a pivoting swivel connection which can be used with the clip.

FIG. 30 shows an alternative connector 120 which is provided with a ball joint connector.

FIG. 31 shows a clip to which is pivotally connected a buckle 130. As shown in FIGS. 32, 33 and 34, the buckle can be used to connect elongate structures such as a rope or cord 129, belt 131 or tubing 133 to the clip.

FIG. 35 shows an arrangement in which the clip is connected to a buckle 130 by means of a spring 132. The spring 132 can be used to provide a degree of permanent tension between the buckle 130 and the clip 1.

Figure 36:
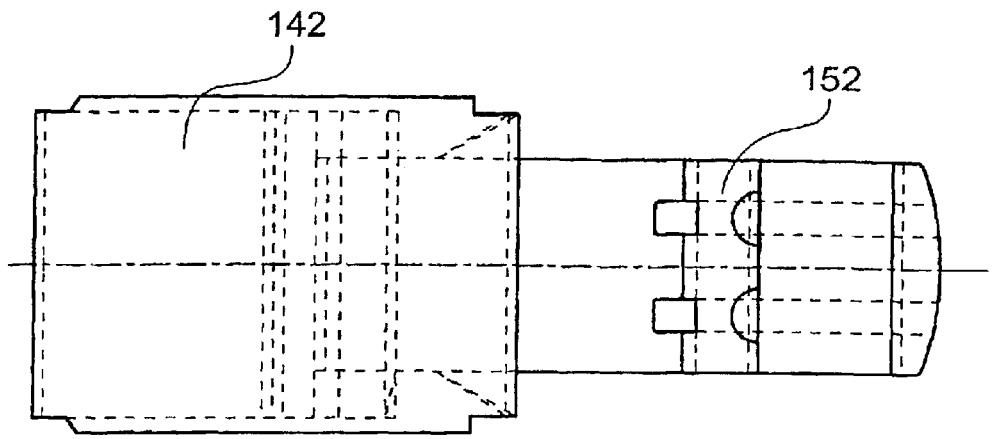
FIG. 36 is a top view of a clip with a modified spring and pivot arrangement.
Figure 37:
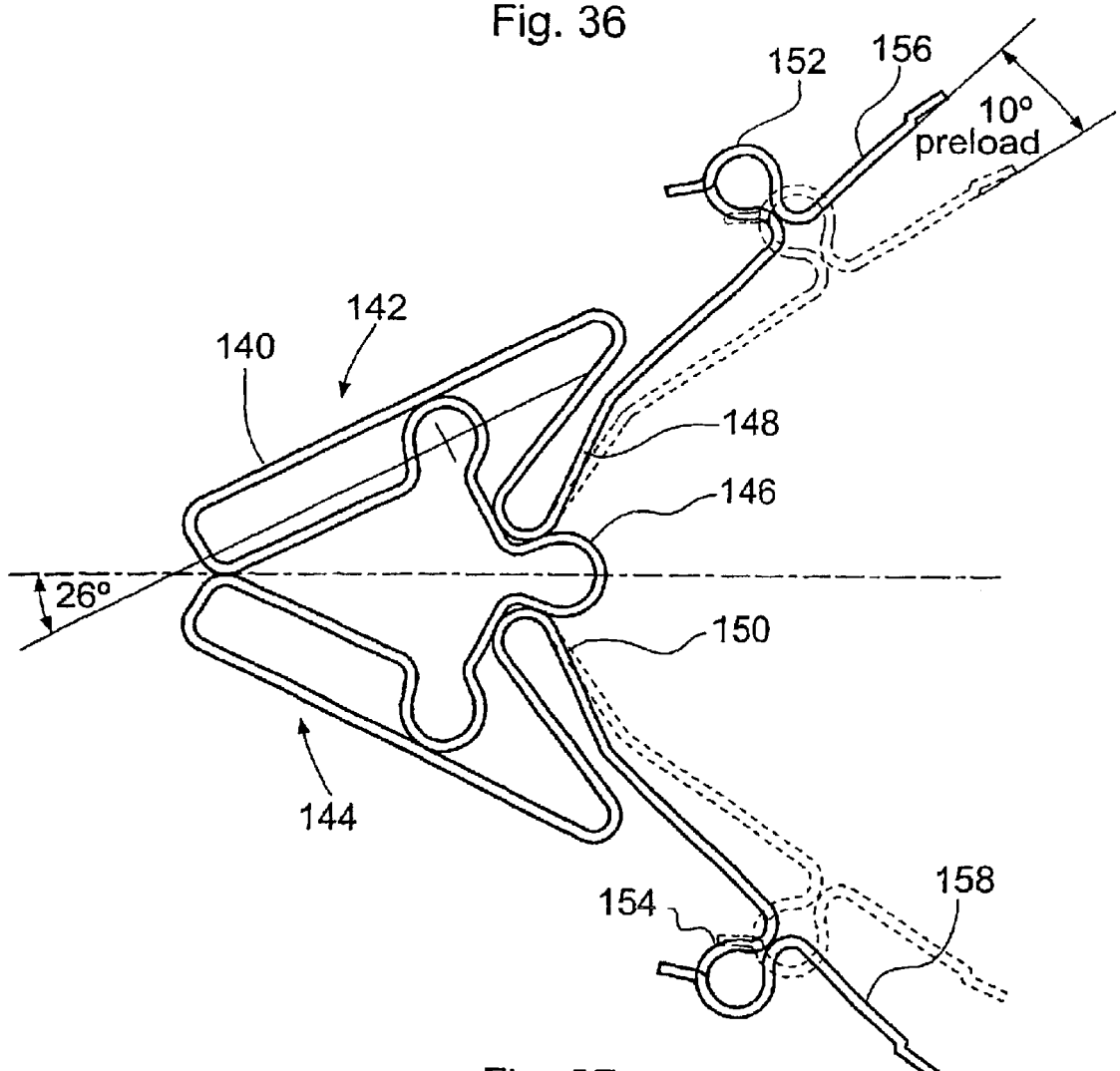
FIG. 37 is a side view of the modified clip of FIG. 36.

FIGS. 36 and 37 show an alternative arrangement of spring/pivot assembly formed from a single strip of stainless steel 140. The strip 140 is bent to form jaw elements 142, 144, a pivot 146, a pair of pivot members 148, 150 which engage on opposite sides of the pivot 146, and a pair of arms 156, 158 which may be pressed together to open the clip. Each arm 156, 158 is provided with a respective projecting tang 152, 154.

Figure 38:
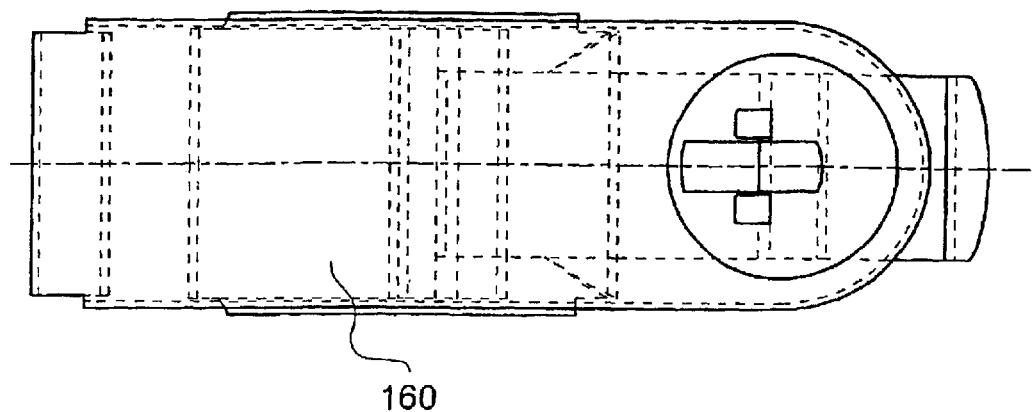
FIG. 38 is a top view of the modified clip of FIG. 36 with a combined jaw and cover assembly in place.
Figure 39:
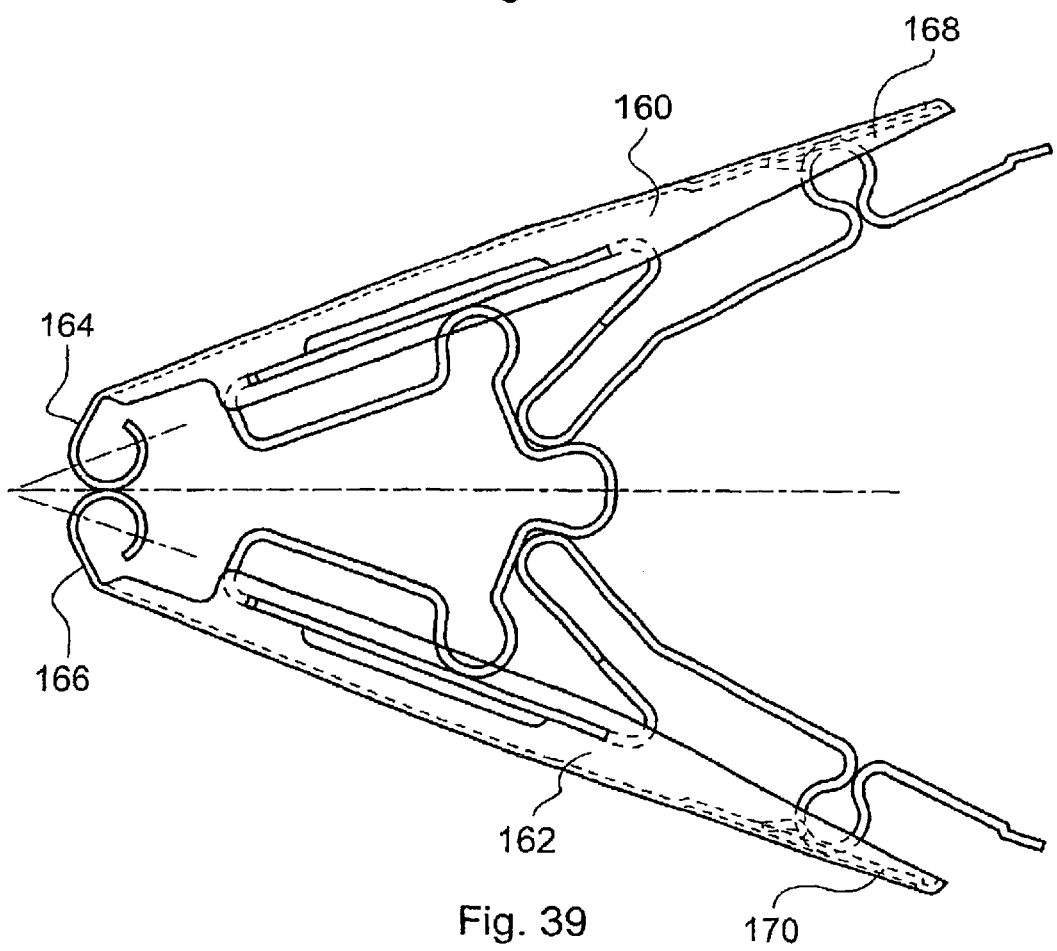
FIG. 39 is a side view of a clip of FIG. 36 with a combined jaw and cover assembly in place.

FIGS. 38 and 39 show the strip 140 fitted with combined jaw and cover elements 160, 162. First ends of the jaw and cover elements 160, 162 comprise opposing jaws 164, 166 of the primary clamp, whereas the opposite ends of the jaw and cover elements 160, 162 comprise first jaws 168 170 of respective secondary and tertiary clamps. The second jaws of these secondary and tertiary clamps comprise the arm 156, 158 of the strip 140.

When the jaw and cover elements 160, 162 are fixed to the strip 140, the arms 156, 158 are pushed together by engagement of the tangs 152, 154 with the jaw and cover elements.

Preferably each arm 156, 158 is defected inwardly by 10°, so that the secondary and tertiary clips are under a small preload.

The preload in the arms can be adjusted to ensure that the clamping force in the secondary and tertiary clamps is adequate. Furthermore, the clamping force of the secondary and tertiary clamps is preferably adjusted, such that it is less than the clamping force of the primary clamp.

Clips in accordance with the present invention can be used with the various accessories referred to above to attach the same materials or different materials together to form, for example a building system for displays. Also clips can be attached to each other at an unlimited distance by means of adapters attached to cables, string, rope or straps to act as a drying line, to grown plants on, or to string cables. The materials can be clipped to branches, poles etc. using adapters to attach to soft canvas materials with straps or cords, at the same time using springs to keep permanent tension within the material and to let the material give when pressures are applied such as wind pressure. Possible applications are temporary buildings and tents etc. Thus a clip in accordance with the present invention is not limited to medical applications, but can be used widely in all manner of different technical fields.

What is claimed is:

1. A clip comprising a first clamping element and a second clamping element connected together by a separate spring element which biases an end of the first element and an end of the second element together to form a primary clamp and which forms, together with one of the clamping elements, a secondary clamp, and a third clamping element which is connected to the other clamping elements by the biasing element and is biased into contact with one of the other clamping elements by the biasing element.

2. A clip as claimed in claim 1, further comprising a spring which joins a connector or other accessory to the clip.

3. A clip as claimed in claim 1, in which the third clamping element comprises a part of the biasing element.

4. A clip as claimed in claim 3, in which the third clamping element is integrally formed with the biasing element.

5. A clip as claimed in claim 1, in which the biasing element comprises a flat resilient member.

6. A clip as claimed in claim 5, in which the biasing element comprises a folded metal spring.

7. A clip as claimed in claim 1, in which the biasing element is formed from stainless steel.

8. A clip as claimed in claim 1, in which the biasing element is provided with tangs which locate in corresponding recesses or openings in the clamping elements, such that the clamping elements are connected together by the biasing element.

9. A clip as claimed in claim 1, in which the ends of the respective elements which are biased together comprise jaws which are adapted to grip articles.

10. A clip as claimed in claim 9, in which the jaws are provided with cooperating pairs of semi-circular recesses or cut-outs.

11. A clip as claimed in claim 9, in which one of the jaws is provided with a jaw insert.

12. A clip as claimed in claim 11, in which the jaw insert is pivotally mounted in the outer end of the jaw.

13. A clip as claimed in claim 11, in which the jaw insert is provided with a toothed portion.

14. A clip as claimed in claim 11, in which the jaw insert is replaceable.

15. A clip as claimed in claim 11, in which each jaw is provided with cooperating inserts.

16. A clip as claimed in claim 1, in which at least one of the clamping elements is adapted to receive an accessory, such as a hook or connector.

17. A clip as claimed in claim 1, further comprising a swivelling buckle.

* * * * *